(12) United States Patent
Li et al.

(10) Patent No.: US 7,158,497 B2
(45) Date of Patent: Jan. 2, 2007

(54) METHODS AND APPARATUS FOR SUPPORTING MICRO-MOBILITY WITHIN A RADIO ACCESS NETWORK

(75) Inventors: Hongyi Li, Kanata (CA); Gerard R. Pieris, Ottawa (CA); Donna D. Xu, Milpitas, CA (US); Goran G. Janevski, Nepean (CA); Ahmed Areef Reza, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1162 days.

(21) Appl. No.: 09/858,475

(22) Filed: May 17, 2001

(65) Prior Publication Data

US 2002/0031107 A1 Mar. 14, 2002

Related U.S. Application Data

(60) Provisional application No. 60/229,117, filed on Aug. 31, 2000.

(51) Int. Cl.
*H04Q 7/00* (2006.01)

(52) U.S. Cl. .................. 370/331; 370/349; 455/436

(58) Field of Classification Search ........ 370/328–350; 455/436
See application file for complete search history.

(56) References Cited

U.S. PATENT DOCUMENTS

| | | | |
|---|---|---|---|
| 5,117,422 A | 5/1992 | Hauptschein et al. | |
| 5,442,633 A | 8/1995 | Perkins et al. | |
| 5,859,852 A | 1/1999 | Moura et al. | ............... 370/449 |
| 6,490,259 B1 * | 12/2002 | Agrawal et al. | ............. 370/331 |
| 6,490,451 B1 * | 12/2002 | Denman et al. | ............. 455/436 |
| 6,519,235 B1 * | 2/2003 | Kim et al. | ................... 370/331 |
| 6,519,248 B1 * | 2/2003 | Valko | ......................... 370/352 |
| 6,654,359 B1 * | 11/2003 | La Porta et al. | ............ 370/328 |
| 6,763,007 B1 * | 7/2004 | La Porta et al. | ............ 370/331 |
| 6,765,896 B1 * | 7/2004 | Ahmed et al. | .............. 370/338 |
| 6,804,221 B1 * | 10/2004 | Magret et al. | .............. 370/338 |
| 6,907,017 B1 * | 6/2005 | Reddy et al. | ................ 370/331 |
| 6,947,401 B1 * | 9/2005 | El-Malki et al. | ............. 370/331 |
| 6,973,057 B1 * | 12/2005 | Forslow | ...................... 370/328 |
| 6,988,146 B1 * | 1/2006 | Magret et al. | .............. 709/238 |
| 6,992,995 B1 * | 1/2006 | Agrawal et al. | ............. 370/328 |
| 2002/0062388 A1 * | 5/2002 | Ogier et al. | ................. 709/238 |

FOREIGN PATENT DOCUMENTS

| | | |
|---|---|---|
| EP | 0740440 | 4/1996 |
| EP | 1011241 | 11/1999 |
| EP | 1018822 | 11/1999 |
| WO | 9851041 | 11/1998 |
| WO | 9909707 | 2/1999 |

* cited by examiner

*Primary Examiner*—Doris H. To
*Assistant Examiner*—Ahmed Elallam

(57) ABSTRACT

The invention provides a novel protocol suite for supporting micro-mobility within a radio access network (RAN). The protocol suite and comprises three separate protocols, namely a Mobile Registration Protocol, a Handoff Affected Router Discovery Protocol (HARDP) and a Mobile Location Update Protocol. The Mobile Registration Protocol is used to register mobile terminals within a RAN while the Mobile Location Update Protocol is used to update mobile terminal reachability during a handoff. The HARDP protocol is used at network boot-up time to identify a subset of routers that needs to be updated when a mobile terminal handoff occurs between two neighboring radio access nodes.

29 Claims, 12 Drawing Sheets

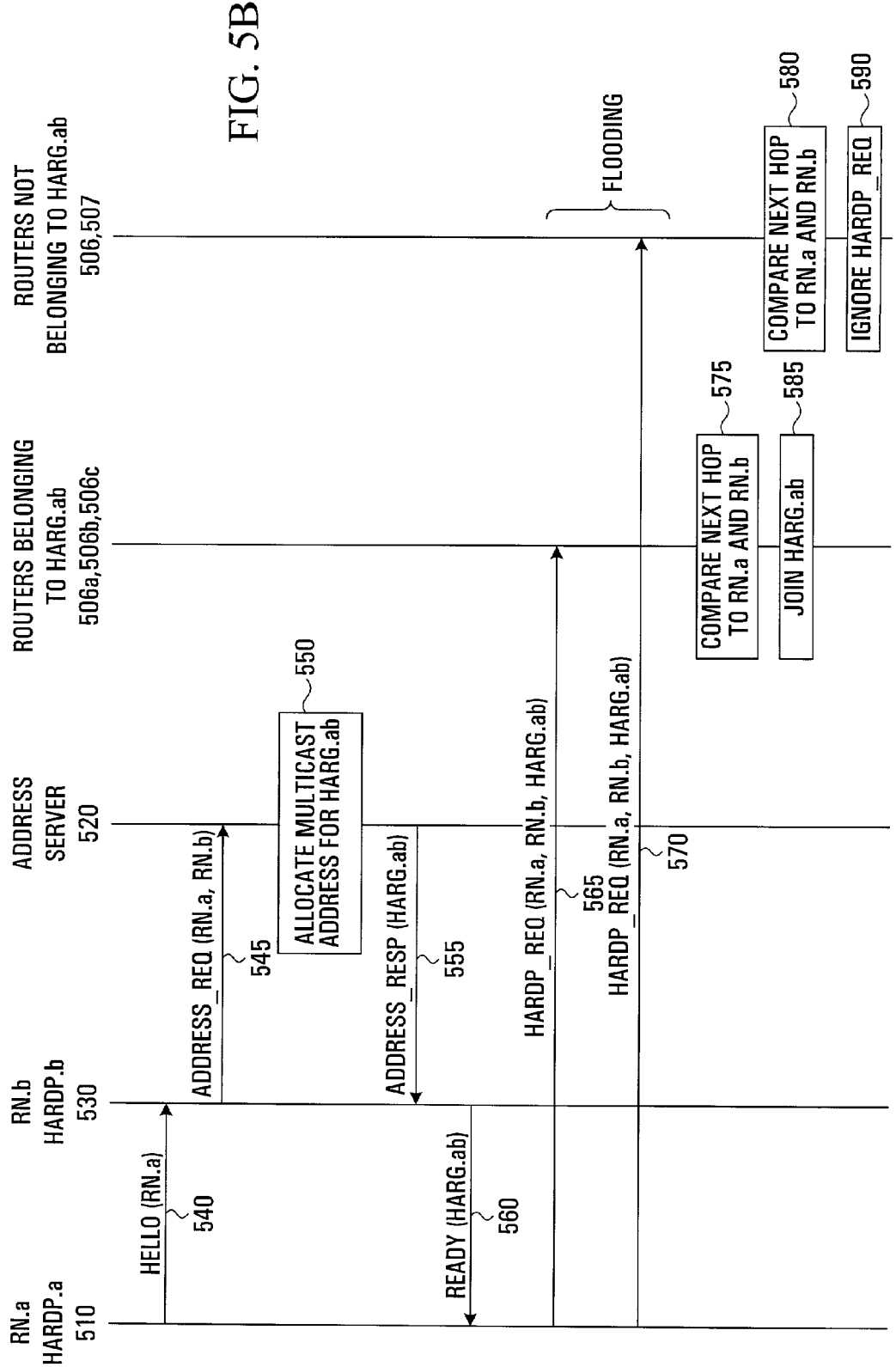

METHODS AND APPARATUS FOR SUPPORTING MICRO-MOBILITY WITHIN A RADIO ACCESS NETWORK

RELATIONSHIP TO PRIOR APPLICATION

This application claims the benefit of U.S. Provisional Application No. 60/229,117, filed Aug. 31, 2000.

FIELD OF THE INVENTION

This invention relates to methods and apparatus for supporting micro-mobility within a radio access network and, more particularly, to methods and apparatus for managing data packet routing in a radio access network.

BACKGROUND OF THE INVENTION

The Internet Protocol was originally developed with the assumption that users, each of which is assigned a unique Internet address, would be connected to the network at fixed locations. However, with the rapid acceptance of portable and handheld devices amongst consumers, the movement or migration of users about an individual network is typically the norm rather than the exception. As a result, the implicit design assumptions of the Internet Protocol are violated by this type of usage.

Radio access networks provide one of the most important network access technologies to extend the reach of the Internet to the mobile population, allowing mobile terminals to communicate with others at anytime, anywhere. Over the years, various mobility models have been proposed to support both wide-area macro-mobility and local-area micro-mobility, with an emphasis on primarily mobile-to-fixed and fixed-to-mobile network communication. These include for example Cellular IP, HAWAII, Mobile IPv4 and IPv6. These solutions, however, do not provide optimal routing paths for mobile-to-mobile communications because of the common requirement of routing IP packets through an anchor point in the network. However, as small and portable network devices rapidly penetrate the market, optimized mobile-to-mobile communication in metropolitan areas (e.g. Ottawa, Toronto) is crucial for the next generation of wireless Internet applications.

FIG. 1 is an example of a typical system which allows mobile terminals to access the Internet. The system consists of two all-IP radio access networks (RANs) 100, 140 providing access services to two metropolitan areas such as Ottawa and Toronto. An all-IP RAN is a pure packet switched network based on the Internet Protocol (IP). Each RAN 100, 140 consists of radio-related network elements called radio access nodes (RNs) 110 that are attached to an infrastructure of cooperative interconnected IP packet routers 106. The radio access nodes (RNs) 110 are radio access points that provide wireless access services to mobile terminals (MTs) 105, 109 within the coverage area of each radio access node. The packet routers 106 interconnect the radio access nodes (RNs) 110 to form the infrastructure for data transportation within each RAN 100, 140. Various gateways and/or network edge routers (NERs) 107 connect each RAN 100, 140 with an Internet backbone 103 comprising a set of routers 119, thereby enabling the mobile terminals (MTs) 105, 109 to access a broad range of network services available throughout the Internet.

A mobile terminal 105, 109 can establish a connection to the Internet 103 through the radio access node (RN) 110 serving the mobile terminal, a sequence of IP routers 106 leading to a network edge router (NER) 107 which is, in turn, directly connected to the Internet backbone 103. The radio access node (RN) 110 serving the mobile terminal is its "point of access" to the network. Because a mobile terminal is by definition mobile, a mobile terminal connecting to the Internet via a wireless interface may change its point of access. This may occur, for example, if the mobile terminal initiates an Internet sessions from different locations or because the mobile terminal is moving while an active data session is ongoing.

Typically, location information is encoded in an Internet address (i.e. IP address). Therefore, in conventional systems, a mobile terminal must be located on the network at the location indicated by its IP address in order to receive IP packets. In such systems, a mobile terminal may need to change its IP address whenever it changes its point of access to the network for it to not lose its ability to communicate. Likewise, if a mobile terminal moves from one network to another, convention dictates that its IP address must also change.

Most user mobility can be assumed to be local to a RAN domain. For example, in FIG. 1 most user mobility would occur within the Ottawa RAN 100 or within the Toronto RAN 140. Each RAN must, therefore, provide efficient mobility support for forwarding data packets that originate from and are destined to mobile users who move within such a RAN. The mobile users in a RAN will include both local users whose home domain is the current network (e.g. the RAN in Ottawa) and roaming users whose home domain is another network (e.g. the RAN in Toronto). Mobility within a single radio access network (RAN) is referred to as micro-mobility while mobility between separate radio access networks is referred to as macro-mobility. Examples of micro-mobility and macro-mobility are indicated at 120, 122 of FIG. 1, respectively.

Consider now FIG. 2 which shows an example system consisting of a single all-IP RAN 200 connected to an Internet backbone 203 via a network edge router (NER) 207. The RAN 200 and the Internet backbone 203 each consist of a plurality of cooperative interconnected routers 206, 209 to form the infrastructure for data transportation in the inter-network. A fixed host (FH) 208 is located outside of the RAN 200 and is connected to the Internet backbone 203 via an access network which is not shown. The RAN 200 has a first radio access node (RN.a) 210 which provides wireless access services to mobile terminals, such as a mobile terminal (MT) 205, in the coverage area of the radio access node (RN.a) 210. Similarly, the RAN 200 has a second radio access node (RN.b) 230 which provides wireless access services to mobile terminals in its respective coverage area.

Suppose, for example, that the mobile terminal (MT) 205 were to leave the coverage area of RN.a 210 and enter the coverage area of RN.b 230. Because the IP addresses are based on location, this necessitates a change in the IP address. However, a change in the IP address would make it impossible for the mobile terminal (MT) 205 to maintain active transport and higher-layer connections (e.g. TCP/UDP sessions) because they do not allow for IP addresses to change during an active session. A change of access point during active data transmission or reception is commonly referred to as a "handoff". During or immediately after a handoff, physical layer losses may occur due to delayed propagation of new location information. These losses need to be minimized in order to avoid a degradation of service quality as handoffs become more and more frequent.

A solution is needed, therefore, whereby a mobile host does not lose any of its sessions due to a handoff. Specifically, some sort of mechanism is required to ensure that packets addressed to moving hosts are successfully delivered with high probability.

Background on IP Routing

An interconnected router system, such as that depicted in FIG. 2, forms the architectural basis for all networks and handles all traffic except for direct delivery from one terminal (or host) to another. Essentially, a data packet travels from router to router until it reaches a router that attaches directly to a node providing service to the final destination. Except for destinations on directly attached networks, terminals (fixed or mobile) pass all IP traffic to routers which forward packets on toward their final destinations.

The conventional IP routing algorithm employs an Internet routing table (IP routing table) on each router that stores information about possible destinations and how to reach them. Whenever the routing IP software in a host or router needs to transmit a data packet, it consults the routing table to decide where to send the data packet. Typically, a routing table contains data pairs (N,R) where N is the IP prefix or IP address of a destination and R is the IP address of the 'next' router along the path to network N. As such, router R is called the next-hop and the idea of using a routing table to store a next-hop for each destination is called "next-hop routing".

The routing table in a router R only specifies one step along the path from R to a destination network N i.e. the router does not know the complete path to a destination. Furthermore, to hide information, keep routing tables small and make routing decisions efficient, IP routing software only keeps information about destination network addresses, not about individual host addresses. Conventionally, most routing has been based on networks and not on individual hosts to minimize information stored in routing tables; most IP routing software implementations do however allow per-host routes to be specified.

When a data packet arrives at a router, the network interface software delivers it to the IP software. Two scenarios are possible. The data packet could have reached its final destination or it may need to travel further. As with hosts, if the data packet destination IP address matches the router's own IP address, the IP software passes the data packet to higher-level protocol software for processing. However, if the data packet has not reached its final destination, IP routes the data packet using the standard IP routing algorithm and information contained in the local routing table.

Specifically, when IP software looks up a route, the algorithm produces the ingress interface of the next node (i.e. the address of the next-hop router) to which the data packet should be sent. IP then passes the data packet and the next hop address to network interface software. Finally, transmission of the data packet from one machine to the next involves encapsulating the data packet in a physical frame, mapping the next-hop address to a physical address, and then sending the frame using underlying hardware. It is important to note that the Internet routing algorithm is table-driven and uses only IP addresses.

In general, establishing routes in a routing table will involve some form of initialization and update. Each router in a network must establish an initial set of routes when it boots up and it must also update the routing table as routes change. In small slowly changing networks, network managers can establish and modify routes manually. Most networks, however, are not static. Connections fail and are later replaced. Automated methods are therefore needed.

The purpose of an automated routing propagation algorithm is not merely to find a set of routes, but to continually update the information as well. To automate the task of keeping network reachability information accurate, routers within a network may communicate with one another exchanging network reachability data or network routing information from which reachability can be deduced. Interior Gateway Protocol or IGP is a generic term used to refer to an algorithm that routers within an autonomous network use when they exchange routing information.

To exchange routing information, routers usually use one of two basic types of algorithms i.e. distance-vector or Shortest Path First (SPF). The chief disadvantage of distance-vector algorithms is that they perform a distributed shortest path computation that may not converge if the status of network connections change continually i.e. the algorithm does not scale well.

The primary alternative to distance-vector algorithms is a class of route propagation algorithms known as link-state, Shortest Path First or SPF. The SPF algorithm requires each participating router to have complete topology information. Additionally, instead of sending messages that contain lists of destinations as in the distance-vector case, a router participating in an SPF algorithm performs two tasks: firstly, it actively tests the status of all neighboring routers and, secondly, it periodically propagates this link status information to all other routers.

For example, to test the status of a directly connected neighbor, a router periodically exchanges short messages that ask whether the neighbor is alive and reachable. If the neighbor replies, the link between them is said to be 'up'. Otherwise the link is said to be "down". To update all other routers, each router will periodically broadcasts a 'link status message' that lists the state of each of its links. Note that the status messages does not specify routes—it simply reports whether communication is possible between router pairs. Protocol software in the routers will arrange to deliver a copy of each link status message to all participating routers.

When a link status message arrives at a router, it uses the information to update its internal map of the network by marking links 'up' or 'down'. Whenever a link status changes, the router recomputes routes by applying the well known Dijkstra shortest path algorithm. Dijkstra's algorithm computes the shortest paths to all destinations from a single source.

One of the most widely used IGPs is the Routing Information Protocol (RIP). The underlying RIP protocol is a straightforward implementation of distance-vector routing algorithm for local networks. An alternative IGP that uses the SPF algorithm and provides better scalability is called Open SPF or OSPF. OSPF sends 'hello' messages on each link periodically to establish and test neighbor reachability. Routers then exchange OSPF database description messages to initialize their network topology database. After exchanging database description messages with a neighbor, a router may request the neighbor to supply updated information by sending a 'link status request' message. Routers respond by broadcasting the status of links with a 'link status update' message.

SUMMARY OF THE INVENTION

The present invention solves the micro-mobility problem for mobile terminals moving within an individual radio access network (RAN) and leaves the mobility between different network domains (i.e. macro-mobility) to wide-area mobility models such as Mobile IP. The invention provides a novel micro-mobility supporting protocol suite called Wireless Internet Protocol (WIP) that enables efficient data packet forwarding and optimized routing for mobile-to-fixed, fixed-to-mobile and mobile-to-mobile communications.

The WIP protocol suite of the invention comprises three new protocols, namely a Mobile Registration Protocol, a Handoff Affected Router Discovery Protocol (HARDP) and a Mobile Location Update Protocol. The Mobile Registration Protocol is used to register mobile terminals within a RAN while the Mobile Location Update Protocol is used to update mobile terminal reachability during a handoff. The HARDP protocol is used at network boot-up time to identify a minimal set of routers that needs to be updated when a mobile terminal handoff occurs between two neighboring radio access nodes. This minimal set of routers is termed a Handoff Affected Router Group (HARG) and may be organized as a single multicast group. When a mobile terminal performs a handoff to a new radio access node, multicasting is used to update the routers in the HARG.

According to a first broad aspect, the invention provides a system for forwarding data packets to a mobile terminal comprising: a radio access network having at least one externally connected gateway node, a plurality of packet routers, and a plurality of radio access nodes each having a respective coverage area and each capable of establishing a wireless communications link with mobile terminals within the respective coverage area, each packet router and each radio access node having a respective network address, each packet router associating a next-hop forwarding entry with each of the radio access nodes; a first protocol adapted to provide an assigned network address to a mobile terminal for a communications session initially through a particular radio access node within whose coverage area the mobile terminal is located and to broadcast the assigned network address and the network address of the particular radio access node to the plurality of packet routers so as to cause each packet router to create a new next-hop forwarding entry for the mobile terminal, the new next-hop forwarding entry for the mobile terminal corresponding with the next-hop forwarding entry for the particular radio access node; a second protocol adapted to update the next-hop forwarding entries of the mobile terminal for a subset of the packet routers when the mobile terminal moves from the coverage area of the particular radio access node to the coverage area of a subsequent radio access node by causing each packet router in the subset of packet routers to change the next-hop forwarding entry for the mobile terminal to correspond with the next-hop forwarding entry for the subsequent radio access node; a third protocol adapted to define said subset of the packet routers for each particular radio access node, subsequent radio access node pair such that only the subset of packet routers are required to update their next-hop forwarding entries for a mobile terminal handoff from the particular radio access node to the subsequent radio access node.

According to a second broad aspect, the invention provides a method for forwarding data packets to a mobile terminal within a radio access network comprising a plurality of packet routers and a plurality of radio access nodes each having a respective network address, the method comprising: providing each packet router with a respective next-hop forwarding table populated with next-hop forwarding entries for each of the plurality of radio access nodes; providing an assigned network address to a mobile terminal for a communications session initially through a particular radio access node within whose coverage area the mobile terminal is located; broadcasting the assigned network address and the network address of the particular radio access node to the plurality of packet routers so as to cause each packet router to create a new next-hop forwarding entry for the mobile terminal, the new next-hop forwarding entry for the mobile terminal corresponding with the next-hop forwarding entry for the particular radio access node; updating the next-hop forwarding tables of a subset of the plurality of packet routers when the mobile terminal moves from the coverage area of the particular radio access node to the coverage area of a subsequent radio access node by causing each packet router in the subset of packet routers to change the next-hop forwarding entry for the mobile terminal to correspond to the next-hop forwarding entry for the subsequent radio access node.

According to a third broad aspect, the invention provides a packet router comprising: a next-hop forwarding table populated with a next-hop forwarding entry for each of a plurality of mobile terminals and radio access nodes; an input adapted to receive a message identifying a network address for a mobile terminal and a network address for a particular radio access node within whose coverage area the mobile terminal is located; a message processor adapted to process said message by: in the event no next-hop forwarding entry exists for the mobile terminal, adding a new next-hop forwarding entry to the next-hop forwarding table, the new next-hop forwarding entry corresponding to the next-hop forwarding entry already in the table for the particular radio access node; and in the event a next-hop forwarding entry exists for the mobile terminal, changing the next-hop forwarding entry for the mobile terminal to correspond to the next-hop forwarding entry already in the table for the particular radio access node; wherein a packet to be routed contains a destination network address of a mobile terminal to which the packet is to be routed, and the packet router forwards the packet to a device identified by the next-hop forwarding entry for the destination network address contained in the packet.

The features of WIP make it an efficient and powerful protocol for supporting micro-mobility within a RAN. In the WIP paradigm, the radio access network (RAN) is a fully routed IP network i.e. a tunnel is not required to support mobility. The WIP protocol suite of the invention employs an efficient data forwarding scheme requiring only one memory-access operation to determine the next-hop. Furthermore, WIP provides an efficient routing table update scheme consisting of only one memory-copy operation. The WIP protocol suite of the invention is compatible with various existing IP routing protocols (e.g. OSPF, RIP etc.) as well as with the existing Mobile IP protocol that supports wide-area mobility.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

FIG. 5B is a message flow diagram detailing the implementation of the Handoff Affected Router Discovery Protocol (HARDP) according to an embodiment of the invention;

DESCRIPTION OF THE PREFERRED EMBODIMENTS

An embodiment of the invention provides a new protocol suite for supporting micro-mobility in a radio access network (RAN). The new protocol suite of the invention will be referred to herein as the "Wireless Internet Protocol" (WIP) and is comprised of three components: a Mobile Registration Protocol, a Mobile Location Update Protocol and a Handoff Affected Router Discovery Protocol (HARDP). Collectively, the new protocols provide for the efficient update of mobile terminal reachability during a 'handoff' between a pair of neighboring radio access nodes and support an optimal mobile-to-mobile communication path within a radio access network (RAN). Furthermore, the protocol suite of the invention supports the existence of multiple gateways within a RAN and the router architecture provides a platform for fast data packet forwarding.

For the present invention, each router in a RAN is adapted to contain a next-hop forwarding (or routing) table which indexes 'all' valid IP addresses in the RAN. In this way, host-specific data forwarding for mobile terminals (MTs) may be supported. In other words, the next-hop forwarding table in each router records the 'next-hop forwarding entry' for all registered mobile terminals in the RAN. For each mobile terminal, the next-hop is closer to the radio access node to which the mobile terminal is currently attached.

With respect to architecture, each router in a radio access network (RAN) supporting micro-mobility according to the present invention will generally use two levels of routing table. One table, called the internal cache, maintains next-hop forwarding entries for all nodes internal to the RAN. The second table called the external routing table maintains forwarding entries for external networks. The destination address of each IP packet received at a node is first checked to determine if the network prefix portion is internal or external. If the prefix indicates an internal node, the internal cache is searched for a match; otherwise the external routing table is searched. The internal cache is searched using an index search method and the external routing table is searched using the conventional 'longest-matching-prefix' search method.

For the internal cache routing table, the next-hop forwarding entries for fixed nodes in the network are computed using OSPF or any other Internet routing protocol. As will be seen later, the routing table entries for mobile terminals are obtained by copying the entries for the radio nodes to which each mobile terminal attaches. The addresses for all nodes and mobiles in a network adapted to perform the routing protocols provided by the invention are defined to be of the form 'network-prefix.host' where the network-prefix is n bits and the host is h bits long. In case the network prefix is constant for all nodes and mobiles in a particular network, the number of different addresses in the network domain will be at most $2^h$.

Figure 3:
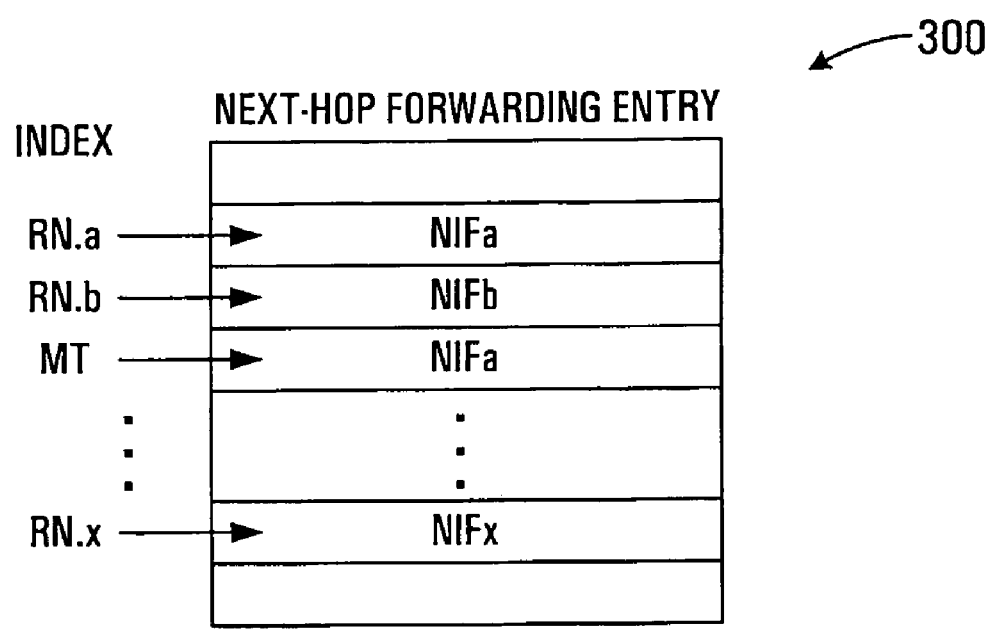
FIG. 3 is an example of the organization of a typical internal cache routing table.

FIG. 3 displays the organization of the internal cache next-hop forwarding table. As seen, the next-hop forwarding entries are maintained in the form of an array 300. All valid radio access nodes and mobile terminals within a radio access network will be indexed in the array 300. The next-hop forwarding table associates the network address NIFx of a next-hop device to which a data packet should be forwarded for each registered node or mobile in the network. When a particular router receives an IP packet, the IP header is processed and the destination IP address will be an index into the array. The packet will be forwarded on a link indicated by the next-hop forwarding entry in that location. This type of "index search method" requires only one memory-access operation. Furthermore, the routing table requires only one byte of memory per entry assuming that the number of links per router is less than 256. This gives a memory size of $2^h$ bytes. For one million simultaneous users, h is approximately 20, and the amount of memory required per internal cache routing table is approximately one megabyte (1 MB). Hence, the entire forwarding table can be loaded into very high speed cache memory. Multiple routes to a destination node can be accommodated with additional memory.

The external routing table maintains forwarding entries for external networks and is searched using the conventional 'longest-matching-prefix' search method. The routing table may be populated by a default route or entries from Interior BGP protocol.

The above mentioned router architecture can reduce the routing table lookup time and support simple and efficient packet forwarding. However, it is also possible to merge the two routing tables into one and use the 'longest matching prefix' algorithm to determine the next hop forwarding path.

Route summarization and de-summarization techniques can be used to reduce the size of the routing table. The routes for the destination addresses that have the same network prefix and the same next hop forwarding path can be merged into a single routing table entry and use the common prefix for routing table lookup.

The first component of the WIP protocol suite is a Mobile Registration Protocol. As the name implies, this protocol provides a scheme for mobile terminal registration within a RAN. Consider FIG. 4A, which depicts an all-IP RAN 400 identical to the RAN 200 shown in FIG. 2. As before, the RAN 400 consists of a set of cooperative interconnected routers 406 (including 406a, 406b), 407 which form the infrastructure for data transportation in the RAN 400. A first radio access node (RN.a) 410 is attached to the router 406*a* while a second radio access node (RN.b) 430 is attached to the router 406*b*. Finally, a mobile terminal (MT) 405 is located in the coverage area of the first radio access node (RN.a) 410.

Figure 4A:
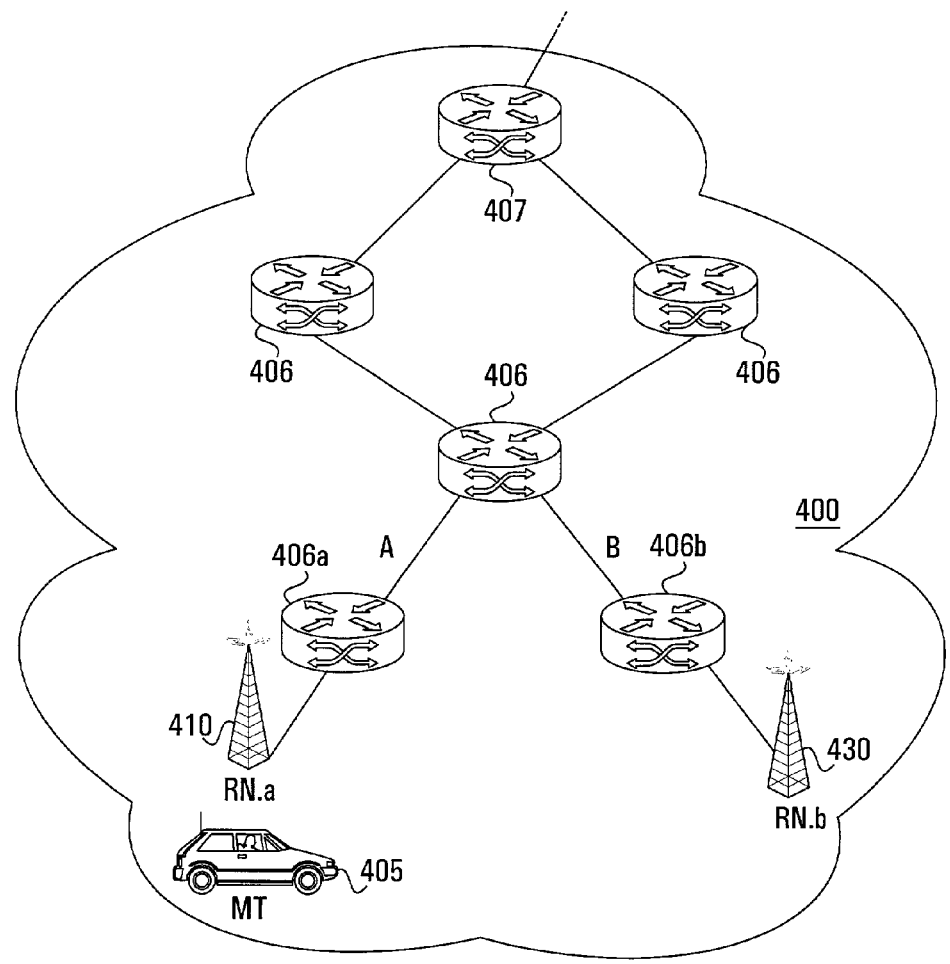
FIG. 4A depicts an all-IP radio access network (RAN) with a mobile terminal (MT) in the coverage area of a particular radio node.
Figure 4C:
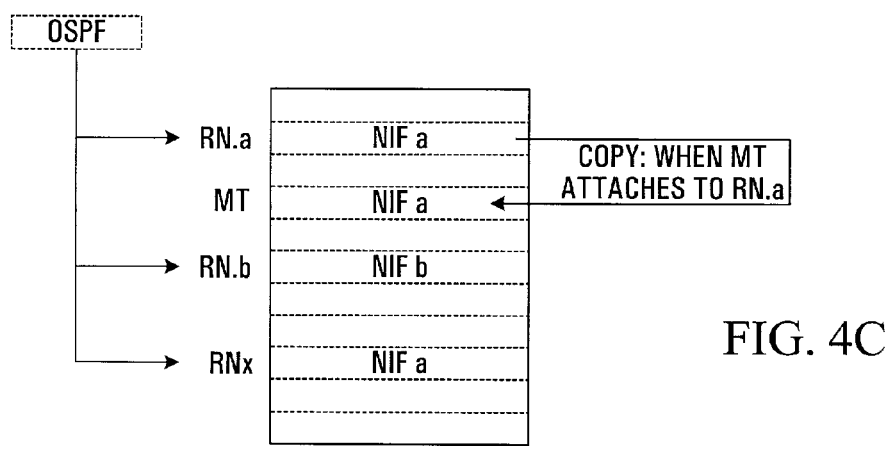
FIG. 4C illustrates the routing table update process for packet routers in a RAN implementing the Mobile Registration Protocol of FIG. 4B.
Figure 4B:
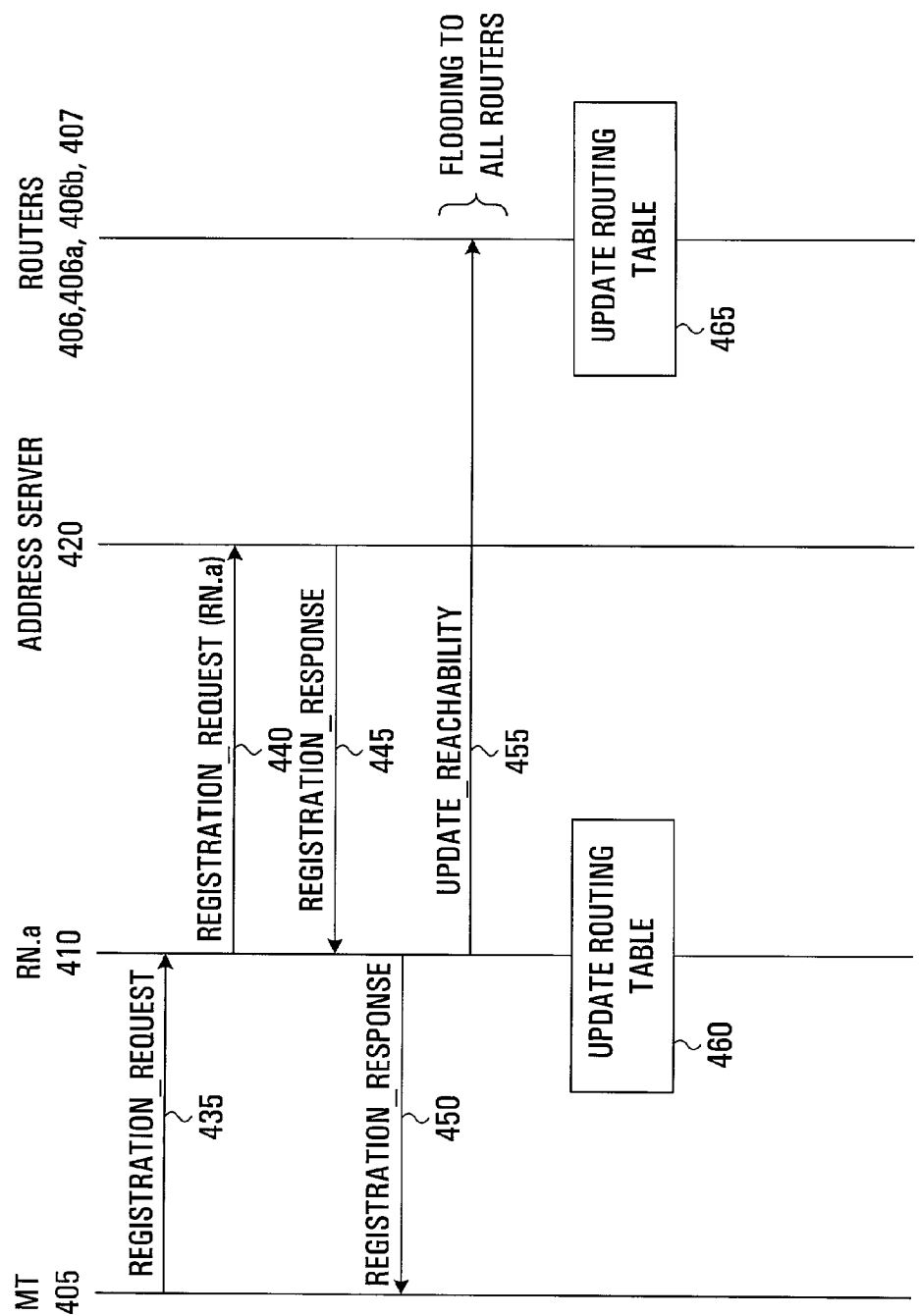
FIG. 4B is a message flow diagram detailing the Mobile Registration Protocol provided by an embodiment of the invention.

FIG. 4B is a message flow diagram detailing the network registration process for the MT 405 in FIG. 4A. When the mobile terminal (MT) 405 powers up to attach to the RAN 400, it first establishes a wireless communications link with the radio access node in whose coverage area it resides, or in this case RN.a 410. The mobile terminal (MT) 405 then requests an IP address to be assigned to it from an address server 420. To do so, the MT 405 sends a REGISTRATION_REQUEST message 435 to RN.a 410 which, in turn, forwards a modified REGISTRATION_REQUEST message 440 to the address server 420. The address server 420 replies with a REGISTRATION_RESPONSE message 445 to RN.a 410 which includes a newly assigned IP address for the MT 405. The newly assigned IP address will be one of the possible IP addresses for the RAN which was not previously assigned. RN.a 410 subsequently sends this information in a REGISTRATION_RESPONSE message 450 to the MT 405. At the same time the RN creates a binding between the MT's IP address and link layer address for sending/receiving data to/from the MT.

RN.a 410 then broadcasts the mobile terminal's newly assigned IP address and its own IP address in an UPDATE_REACHABILITY message 455 to all routers in the RAN 400 using, for example, a flooding protocol (See Routing in the Internet by Christian Huitema, Prentice Hall Publishers, $2^{nd}$ Edition, January 2000 hereby incorporated by reference). In so doing, an (RN.a, MT) IP address pair is distributed to all the routers in the RAN 400. RN.a 410 and all the routers in the RAN 400 then update their internal cache routing tables by adding a new next-hop forwarding entry for the newly registered MT 405. This is indicated in FIG. 4B by an UPDATE ROUTING TABLE function 460 for RN.a 410 and by an UPDATE ROUTING TABLE function 465 for the routers comprising the RAN 400. In each router, the new next-hop forwarding entry for the mobile terminal (MT) 405 will, of course, be the same as the next-hop forwarding entry for the radio access node (RN.a) 410 to which it attaches.

The proactive approach can be used to allocate a set of IP addresses to a RN such that the set of addresses can be registered in the network (i.e., broadcast the association between the allocated IP addresses and the RN address to all the routers in the RAN) before they are actually assigned to mobile terminals. As the routes have been set up in routers for these addresses, the RN can assign an unused IP address to a new MT without flooding the new association to all the routers again. Therefore, the proactive approach can reduce the time required for mobile terminal registration.

FIG. 4C shows the internal cache routing table update process for mobile terminal 405 registration as depicted FIGS. 4A and 4B. Each router in the RAN 400 will update its internal cache routing table by copying the next-hop forwarding entry indexed by the IP address of the first radio access node (RN.a) 410 to the entry indexed by the IP address of the mobile terminal (MT) 405.

Consider now that the mobile terminal (MT) 405 in FIG. 4A moves out of the coverage area of RN.a 410 and into the coverage area of RN.b 430. According to this embodiment, the IP address of the MT 405 does not change but rather, the next-hop forwarding entries for the MT 405 in the routers' internal cache routing tables are updated such that packets can be routed to the MT 405 at its new location. According to the invention only a subset of routers within the RAN 400 are required to update their internal cache routing tables for a mobile terminal handoff.

In the present invention, the subset of routers to be affected by a handoff between neighboring radio access nodes (e.g. from RN.a 410 to RN.b 430 in FIG. 4A) may, for example, be predetermined at the network boot-up time by a Handoff Affected Router Discovery Protocol (HARDP). Such a subset of routers is defined for each pair of radio access nodes which may be involved in a handoff. This subset of routers is appropriately called a Handoff Affected Router Group (HARG). Whenever there is a handoff and a mobile terminal (MT) attaches to a new radio access node, the mapping of handoff mobile terminal's IP address and the new radio access node's IP address is sent to only those routers contained in the predetermined HARG. Each router in the HARG will then update its next-hop forwarding table by changing the next-hop forwarding entry for the mobile terminal to correspond with the next-hop forwarding entry for the new radio access node.

In the embodiment described below, each HARG is associated with a respective multicast address such that the entire HARG can be updated by sending messages to the multicast address. More generally however, any suitable messaging approach which updates the appropriate HARG can be employed. For example, a message could be sent individually to each router in the HARG, this being less efficient.

The Handoff Affected Router Discovery Protocol (HARDP) is the second component of the WIP protocol suite and is used to determine the HARG at network boot-up time and to update the HARG group membership whenever there is a topology change in the network which will be described with reference to FIG. 5C. In accordance with this protocol, whenever a radio access node boots up, the radio access node will be assigned a respective HARG multicast address for each of its neighboring radio access nodes which have a common radio coverage area (step 5C-1). For each neighboring radio access node, the bootup radio access node broadcasts a registration message to all the routers in the network which includes the boot-up radio access node IP address, the neighboring radio access node IP address and the corresponding HARG multicast IP address (step 5C-2). Each router in the network receives each of these registration messages and decides whether or not to join the respective HARG (step 5C-3). A router joins a respective HARG if the next-hop forwarding entry in its internal cache routing table for the boot-up radio access node is different from the one for the neighboring radio access node.

Figure 1:
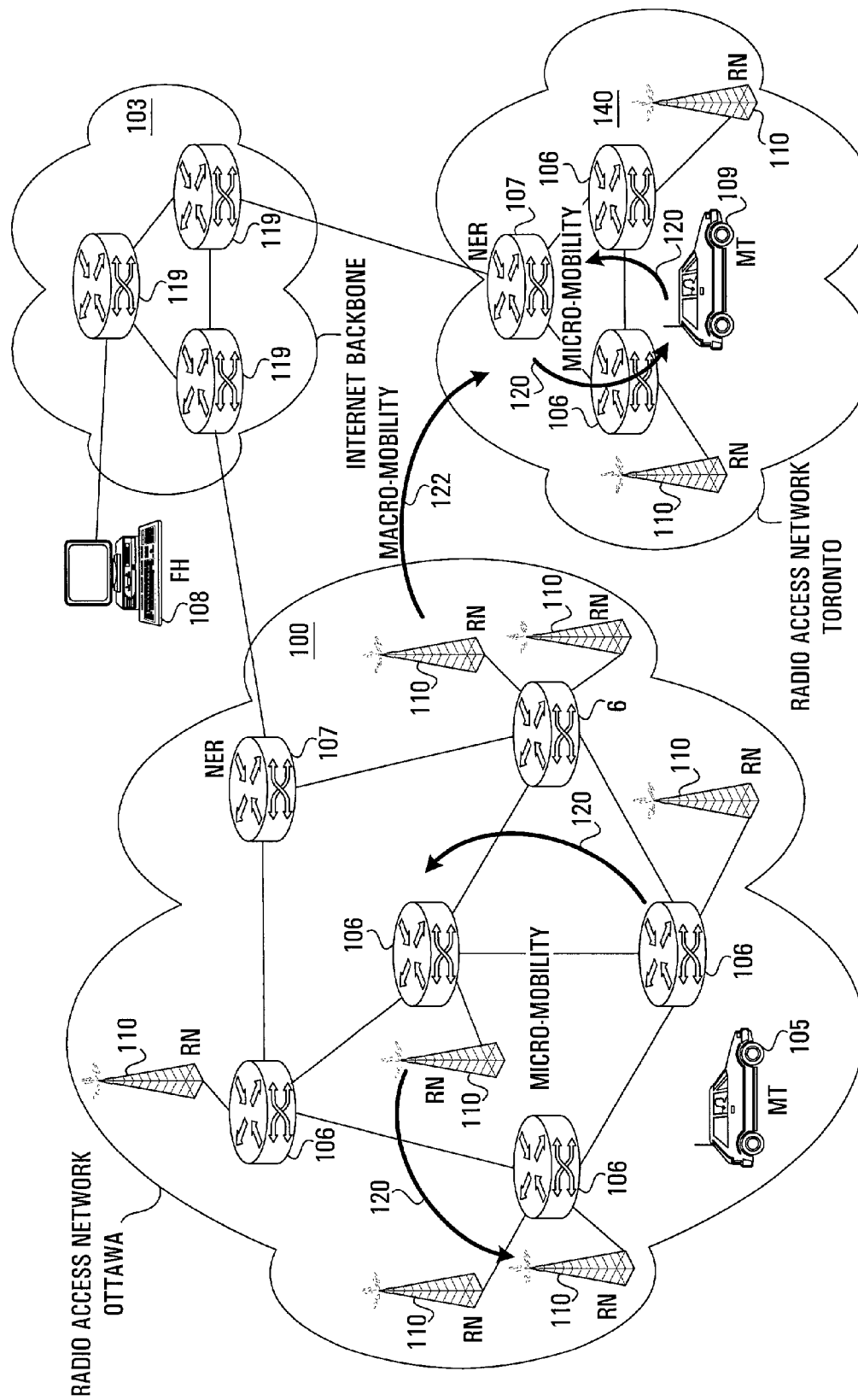
FIG. 1 is a schematic of an example of a system providing wireless access services to two regions.
Figure 2:
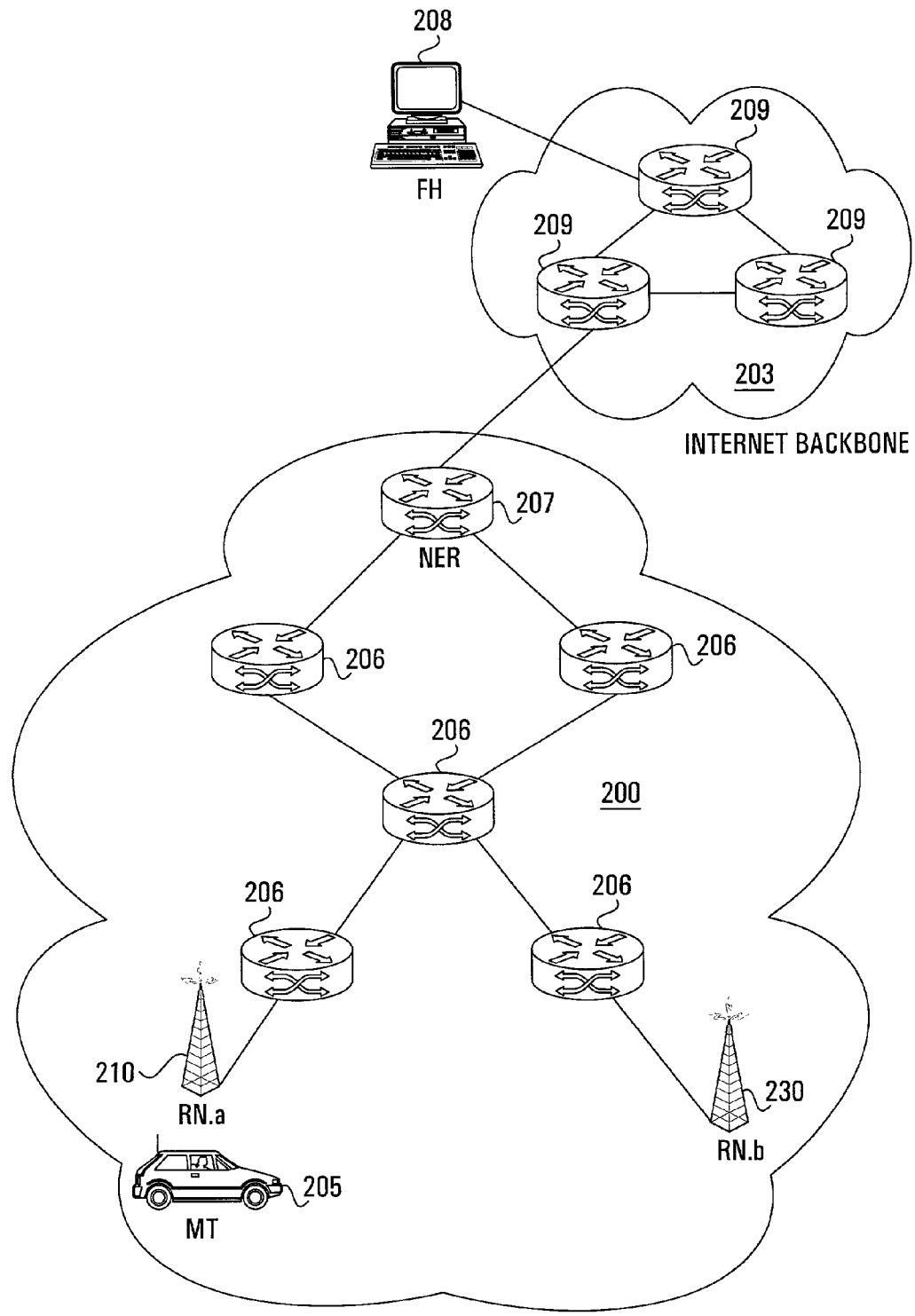
FIG. 2 is a schematic of an example of a system consisting of a single all-IP radio access network.
Figure 5A:
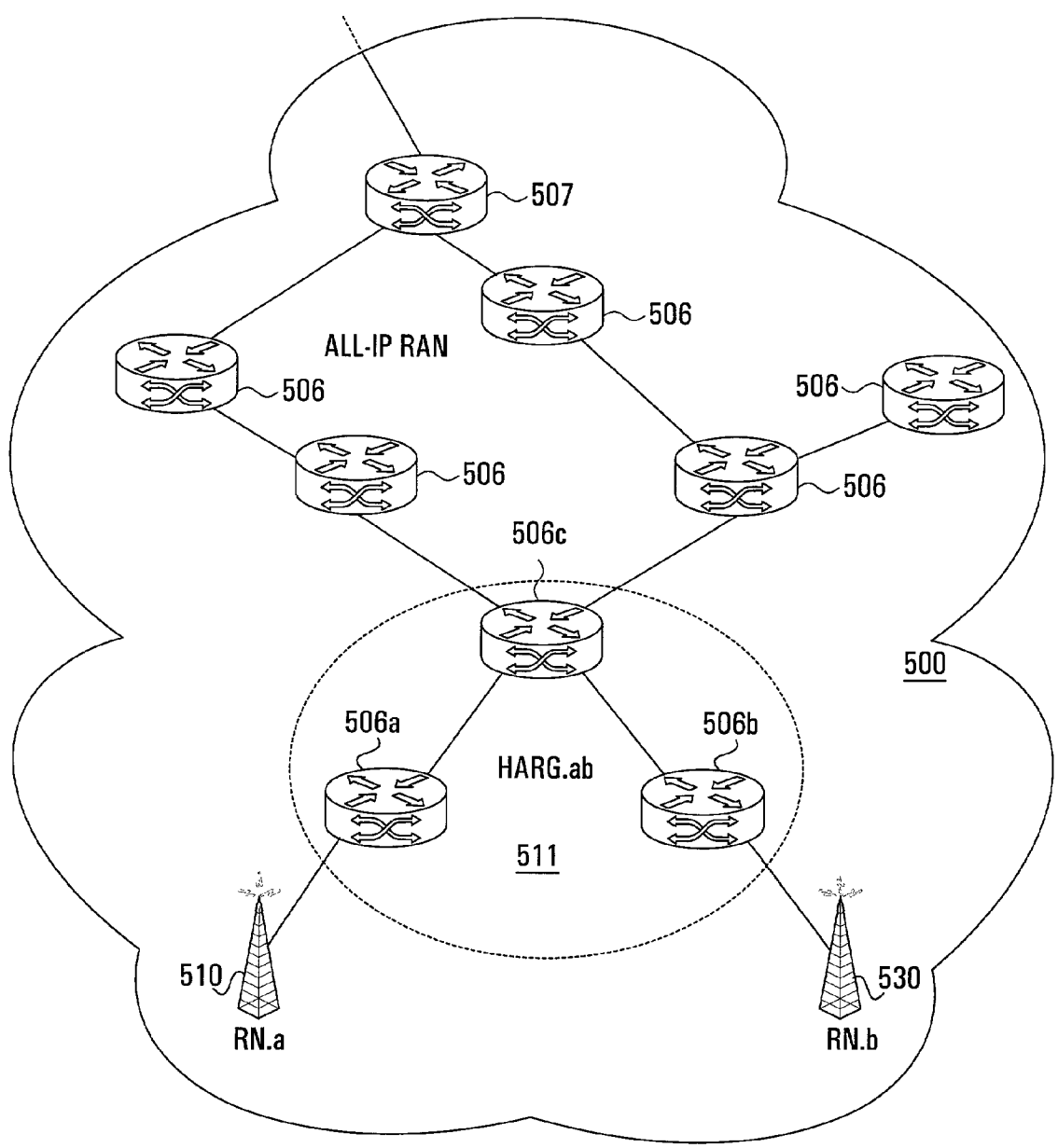
FIG. 5A depicts the Handoff Affected Router Group (HARG) between two neighboring radio access nodes in an all-IP RAN.
Figure 5C:
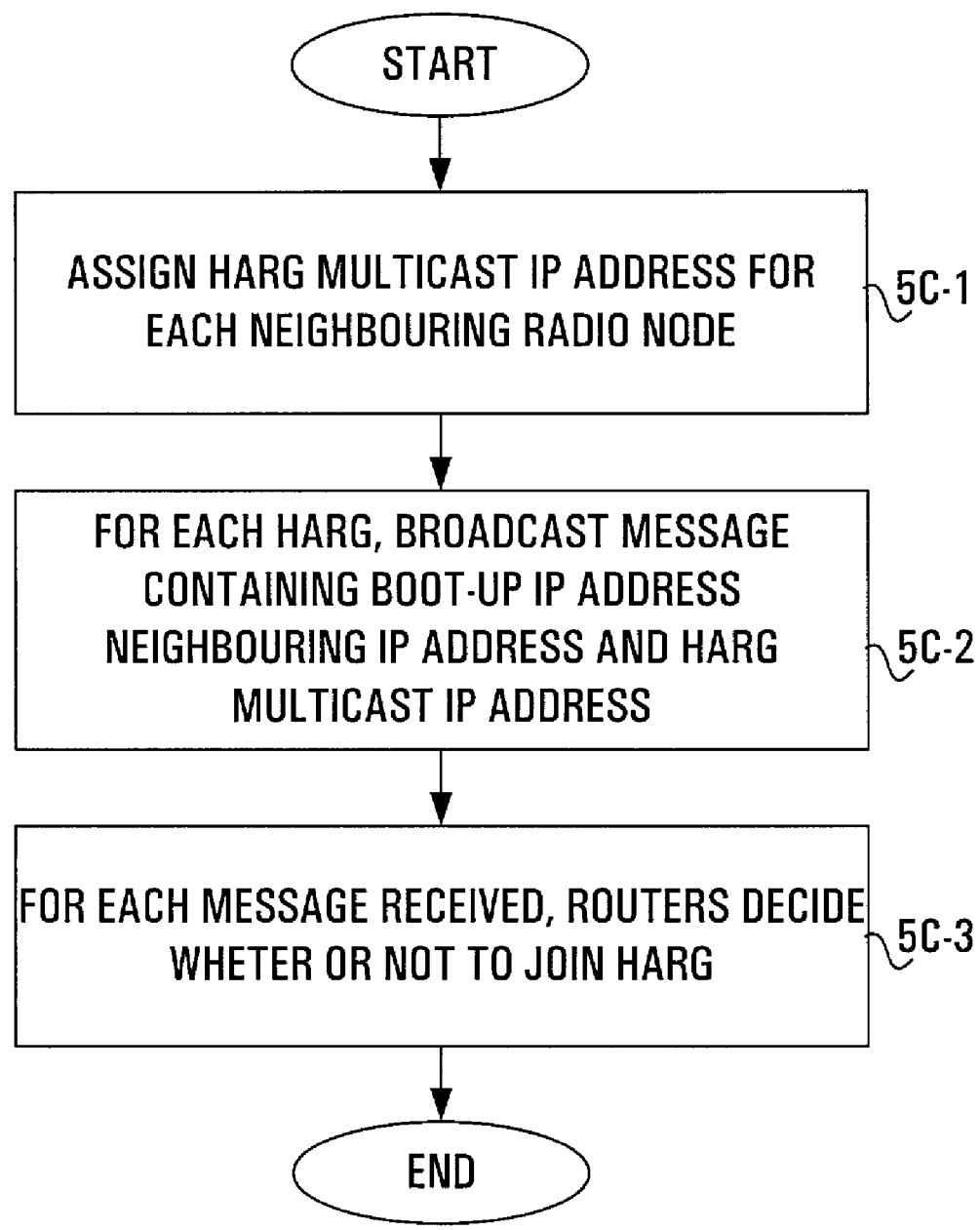
FIG. 5C is a flowchart detailing the implementation of the Handoff Affected Router Discovery Protocol (HARDP) according to an embodiment of the invention.

Consider FIG. 5A, for example, depicting an all-IP RAN 500 having the same basic configuration as the RANs 200 and 400 depicted in FIGS. 2 and 4A, respectively. The RAN 500 consists of a set of interconnected routers 506 (including 506*a*, 506*b*, 506*c*), 507 which collectively form the infrastructure for data transportation in the network. A first radio access node (RN.a) 510 is connected to a router 506*a* and a second radio node (RN.b) 530 is connected to a router 506*b*.

According to a preferred implementation of the invention, each radio access node in a RAN will run a HARDP 'daemon' after booting up. The concept of a daemon is generally well known in the art as defining a process running in the background and carrying out operations on behalf of the system. In this case, the HARDP daemon is also responsible for initiating the discovery task of the HARDP by broadcasting a HELLO message to all neighboring radio access nodes (as determined at the network configuration time).

FIG. 5B is a message flow diagram detailing a specific implementation of the HARDP protocol described with reference to FIG. 5C for the example RAN 500 of FIG. 5A. As described, the HARDP daemon (HARDP.a) of RN.a 510 initiates the process by broadcasting a HELLO message 540 to all its neighboring radio access nodes, in this case RN.b 530. The HARDP daemon (HARDP.b) of RN.b 530, in response to receiving the HELLO message 540, sends an ADDRESS_REQ message 545 identifying RN.a 510 and RN.b 530 to an Address Server 520 located in the network. The Address Server 520 may be resident on any router within the RAN 500 and, as illustrated by a functional block 550, assigns a single multicast address to represent the HARG between RN.a 510 and RN.b 530, referred to as HARG.ab. Different ways can be used to discover the neighboring RNs such as using static radio engineering or a dynamic neighbor RN learning algorithm. Neighboring RN learning algorithms can be used in complement with radio engineering. This means most of the neighboring relationships are determined by radio engineering while some of the neighboring relationships that were not planned in the engineering phase, are determined by the neighbor learning process. If a handoff occurs between a pair of RNs, and the pair of RNs were not configured as neighbors during radio engineering process, the handoff will fail in this case because there is no HARG defined for this pair of RNs. However, the pair of RNs can learn from the failed handoff that they are neighbors. Then the pair of RNs can use HARDP to identify their HARG.

The multicast address assigned to HARG.ab is conveyed to the HARDP daemon (HARDP.b) of RN.b 530 in the form of an ADDRESS_RESP message 555. The HARDP daemon (HARDP.b) of RN.b 530 then sends a READY message 560 to the HARDP daemon (HARDP.a) of RN.a 510 which also contains the multicast address assigned to HARG.ab by the Address Server 520.

After receiving the READY message 560, the HARDP.a of RN.a 510 broadcasts a HARDP_REQ message 565, 570 to all the routers in the RAN 500 using, for example, a flooding protocol as detailed in Routing in the Internet by Christian Huitema, Prentice Hall Publishers, 2$^{nd}$ Edition, January 2000. The HARDP_REQ message 565, 570 contains the network addresses of RN.a 510 and RN.b 530 and the assigned multicast address for HARG.ab. For ease of understanding, the routers in the RAN 500 have been divided into two groups, one for the routers 506a, 506b, 506c belonging to HARG.ab and the other for the routers 506, 507 not in HARG.ab. Accordingly, two HARDP_REQ messages 565, 570 are shown to indicate that the same HARDP_REQ message is broadcast to all routers in the RAN 500.

Each router in the RAN 500 will then compare the respective next-hop forwarding entries in its routing table for RN.a 510 and RN.b 530, as shown by a first and second functional block 575, 580. If the next-hop forwarding entries for RN.a 510 and RN.b 530 in a particular router are different, that router issues an IGMP "JOIN" request message (not shown) to join the HARG.ab as indicated by a functional block 585. Otherwise, the router ignores the HARDP_REQUEST message as shown in a functional block 590.

Referring back to FIG. 5A, the subset of routers 506a, 506b and 506c join HARG.ab 511. Only these routers will be affected by future mobile terminal handoffs between RN.a 510 and RN.b 530. The HARDP protocol described above will be repeated whenever there is a topology change in the RAN 500.

In a second implementation of the HARDP protocol, the READY message sent by HARDP.b to HARDP.a also proposes a Virtual Handoff Mobile (VHM) address. In response to the READY message, the daemon (HARDP.a) of RN.a broadcasts a registration message to all the routers in the RAN which includes the VHM address and the network address of RN.a. Sufficient time is allowed for all routers in the RAN to update their routing table forwarding entries for this particular VHM address. The daemon (HARDP.a) of RN.a then sends an UPDATE_HARG message to the daemon (HARDP.b) of RN.b. This UPDATE_HARG message triggers HARDP.b to flood the entire RAN with another VHM registration message. This registration message will contain the VHM address, the address of RN.b and the previously assigned multicast address of the HARG between the two respective radio nodes RN.a and RN.b.

All routers in the RAN will then compute a new next-hop forwarding entry for the VHM address. Subsequently, each router compares the newly computed next-hop entry for the VHM address with the old entry in its internal cache routing table. If there is a change in the next-hop entry for the VHM address in a particular router, that router uses the well known Internet Group Management Protocol (IGMP) to issue an IGMP 'JOIN' request message to join the HARG. IGMP is a standard used in packet-switched networks to communicate group membership information to all nodes participating in an IP multicast.

After the HARG has been determined, the daemon (HARDP.a) of RN.a de-registers the VHM address from all the routers by broadcasting a DEREGISTER message. Only those routers that joined the HARG will be affected by future mobile host handoffs between RN.a and RN.b. In this case, therefore, the VHM address is used to perform a 'virtual handoff' from RN.a to RN.b, thereby allowing the determination of the HARG.

In a third and slightly varying implementation, the VHM registration message can instead be sent by the daemon (HARDP.a) of RN.a 510 such that the UPDATE_HARG message is not required. In this case, the VHM registers with RN.b 530 but its registration message is sent by RN.a 510.

HARG membership may be updated if there is a topology change in the network. Routing protocol will detect the network topology change and re-compute the forwarding entries at each router. After the forwarding entries have been recomputed, a router knows the RNs for which the forwarding entries changed. A HARG table is used to maintain all the HARGs with respect pairs of RNs and an entry of this table records a HARG's multicast address with the IP addresses of the pair of associated RNs. This table can be stored in the address server or distributed in all the routers. Based on the HARG table and the re-computed routes, a router decides JOIN/LEAVE a HARG using following algorithm:

If the previously common next hop forwarding path for RN.a and RN.b is split after the route change, the router must join the HARG.ab.

If the previously separated next hop forward paths for RN.a and RN.b are merged into one, the router must leave the HARG.ab.

The motivation behind sending handoff (location update) message to only the HARG as opposed to broadcasting the information to all routers in the RAN is to reduce the number of routers needing updating during a handoff. If the size of the HARG is too big, then there may not be a significant reduction in the number of routers to be updated from the simple broadcasting case. As well, the time interval required to complete an update after a MT changes its location is closely related to the size of the HARG and this time will be significantly reduced if the size of the HARG is much smaller than the entire broadcast group or RAN. The difference between the size of the HARG and the size of the RAN reflects the savings in the number of routers which have to be updated for a particular handoff. Therefore, the smaller the HARG, the more beneficial the WIP solution.

The size of a HARG will vary with characteristics of the network i.e. the topology of the network and the connectivity of the network. Each possible handoff is defined as a mobile terminal movement between any pair of neighboring radio access nodes. Sending location update information to only those routers belonging to a HARG will save on messaging overhead in the system and on the processing load imposed on the routers as compared to broadcasting update information to the entire radio access network.

The third and final component which completes the WIP protocol suite of the invention is referred to herein as the Mobile Location Update Protocol. This protocol provides an effective means to update mobile terminal reachability during handoff from one radio access node's respective coverage area to another. Consider FIG. 6A which is an example of a single all-IP RAN 600, similar to the RANs 200, 400 depicted in FIGS. 2 and 4, respectively. The RAN 600 includes a plurality of cooperative interconnected routers 606 (including 606a, 606b, 606c), 607 forming the infrastructure for data transportation in the network. A first radio access node (RN.a) 610 is connected to a router 606a whilst a second radio access node (RN.b) 630 is connected to a router 606b. A mobile terminal (MT) 605, participating in an active data session is initially in the coverage area of RN.a 610 and then moves into the coverage area of RN.b 630.

Figure 6A:
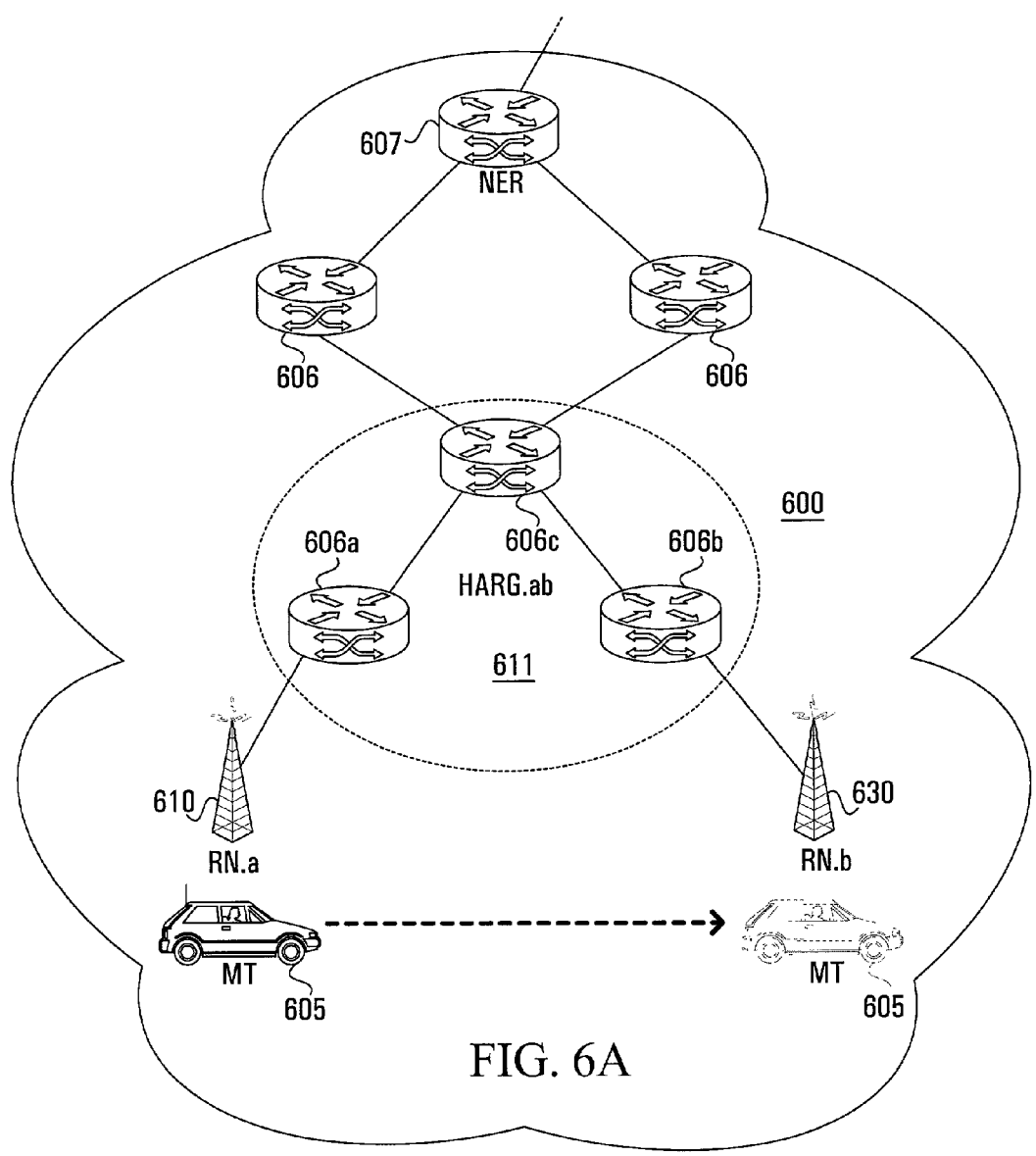
FIG. 6A depicts a mobile terminal handoff in an all-IP radio access network (RAN)

The Mobile Location Update Protocol assumes that the Handoff Affected Router Discovery Protocol (HARDP) has already been used to identify all possible HARGs in a RAN. For example, suppose that the HARDP protocol has determined HARG.ab 611 for handoffs between RN.a 610 and RN.b 630 as depicted in FIG. 6A. In the event MT 605 moves from the coverage area of RN.a 610 to that of RN.b 630, only the group of routers 606a, 606b and 606c comprising the HARG.ab 611 needs to be informed about the handoff in order that each router in that group updates its internal cache routing table to reflect a new "Next-Hop router to destination IP address" mapping.

Figure 6B:
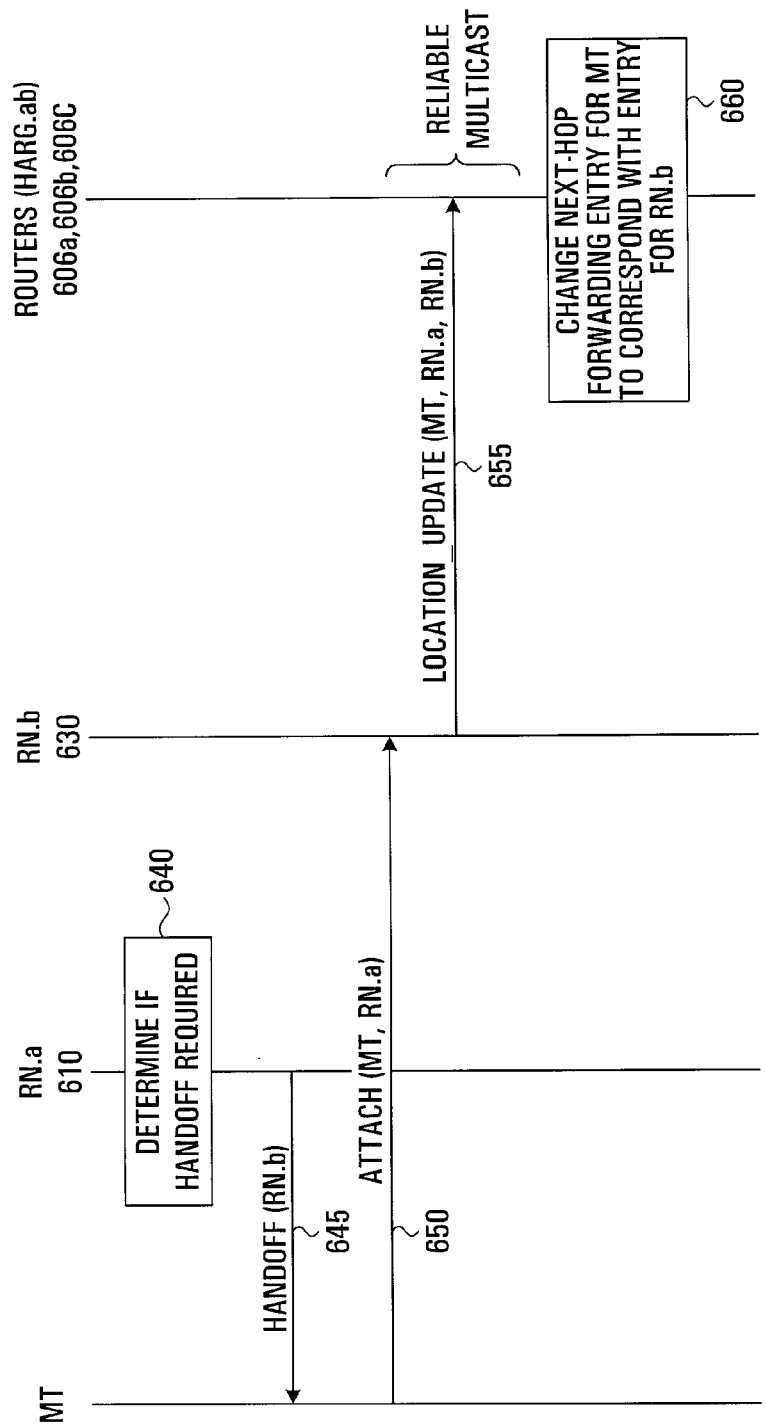
FIG. 6B is a message flow diagram detailing the implementation of the Mobile Location Update Protocol provided by an embodiment of the invention.

FIG. 6B is a message flow diagram detailing the sequence of events according to the Mobile Location Update Protocol for the handoff depicted in FIG. 6A. As the MT 605 approaches the outer limit of RN.a's 610 coverage area, at some instant RN.a 610 will determine that a handoff to RN.b 630 is required. This is indicted by a functional block 640 in FIG. 6B. At this time, RN.a 610 sends a HANDOFF message 645 to the MT 605 indicating that a link to RN.b 630 should be established. The mechanics of establishing a physical connection to the subsequent radio access node are not of concern here, and are assumed to occur using any suitable method.

The MT 605 then sends an ATTACH message 650 to RN.b 630. The ATTACH message 650 identifies the MT 605 and the radio access node (RN.a) 610 whose coverage area the MT 605 is leaving. For example, such identity information may be conveyed using the network IP addresses of the MT 605 and the RN.a 610. After a wireless communications channel or link is established between the MT 605 and RN.b 630, a LOCATION_UPDATE message 655 is sent out by RN.b 630 to all the routers 606a, 606b, 606c belonging to the HARG.ab 611 via, for example, the well known "reliable multicast" facility (details of which may be found in Routing in the Internet by Christian Huitema, Prentice Hall Publishers, $2^{nd}$ Edition, January 2000). The LOCATION_UPDATE message 655 includes a "New Radio Access Node to Mobile Host IP address mapping". Specifically, each router belonging to the handoff multicast group or HARG.ab 611 will receive a (RN.b, MT) IP address pair where RN.b is the new radio access node to which the MT attaches. As indicated in a functional block 660, each router that receives the LOCATION_UPDATE message 655 will update its internal cache routing table by copying the next-hop forwarding entry for the new radio access node (RN.b) 630 to the entry for the mobile terminal (MT) 605.

To maintain consistent routing information for MTs in the routers, the handoff protocol preferably uses a reliable multicast protocol for transmitting location update messages to the routers in HARG. As the size of a HARG may be limited and the members the HARG are generally "close" to the RN where a handoff takes place, a modified selective-reject ARQ type of multicast transport protocol can be used to ensure the reliability of the location update messages sent by the WIP handoff control 720. With modified selective-reject ARQ, all the receivers are required to acknowledge the received messages. The WIP handoff control 720 collects the acknowledgements from all the destinations (i.e., WIP router control 768 at the target HARG members) before a message is considered as received. WIP handoff control will retransmit the message to a destination by unicast if a negative acknowledgement is received from a destination or a time out for that destination. As the location update messages originated from one RN are triggered by different MTs, WIP router control does not need to process these messages in the same sequence as they were sent out. Therefore, an ongoing incomplete location update operation will not block the subsequent location updates from other MTs.

Figure 6C:
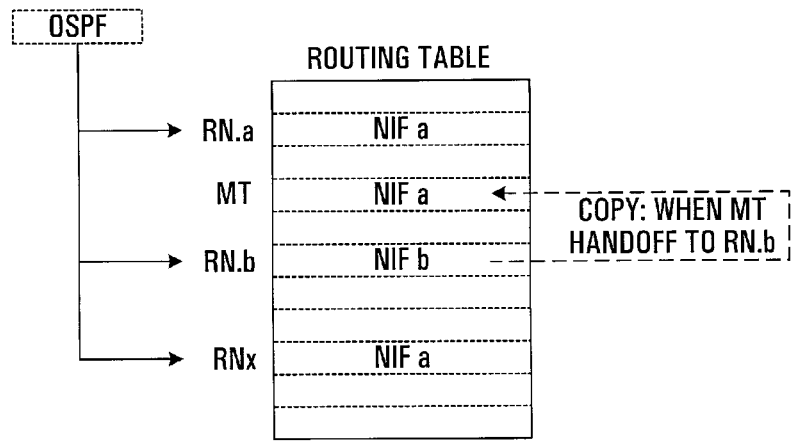
FIG. 6C illustrates the routing table update process for routers in a RAN implementing the Mobile Location Update Protocol of FIG. 6B.

FIG. 6C depicts the general routing table update process performed by each router in the HARG.ab 611 for the MT 605 handoff depicted in FIGS. 6A and 6B. As indicated, the next-hop forwarding entry for the new radio access node (RN.b) 630 in each router's internal cache routing table 630 is copied to the routing table entry indexed by the mobile terminal (MT) 605 and which previously contained the next-hop forwarding entry for the old radio access node (RN.a) 610. After this update is performed, future packets destined for the mobile terminal (MT) 605 will take a different route arriving at the new radio access node (RN.b) 630 and eventually reaching the re-located mobile terminal (MT) 605. Therefore, each router only needs to copy the next-hop forwarding entry corresponding to the new RN's IP address to the location in its internal cache routing table corresponding to the mobile terminal. Advantageously, in the embodiment described, each router in a HARG requires only one memory-copy operation to perform a handoff update.

In embodiments employing prefix based routing table, a route summarization and de-summarization algorithm can be used to minimize the host specific routes in the routing tables. When a router receives a location update request for a MT, the router first removes the host specific routing entry for the MT, and then the router computes the next hop forwarding paths for the MT and the new RN using longest matching prefix algorithm. If the two forwarding paths are different, a host specific route is injected into the routing table; otherwise, the router can ignore the location update request. It is to be noted that other route summarization and de-summarization algorithms can also be used in prefix based routing table.

It should be noted that network traffic generated by updating during a mobile terminal handoff to a new radio access node is not very significant compared to the initial flooding of the entire network. According to the invention, updates are only sent to routers comprising a respective HARG, the size of the HARG normally being very small compared to the size of the entire network.

Figure 7:
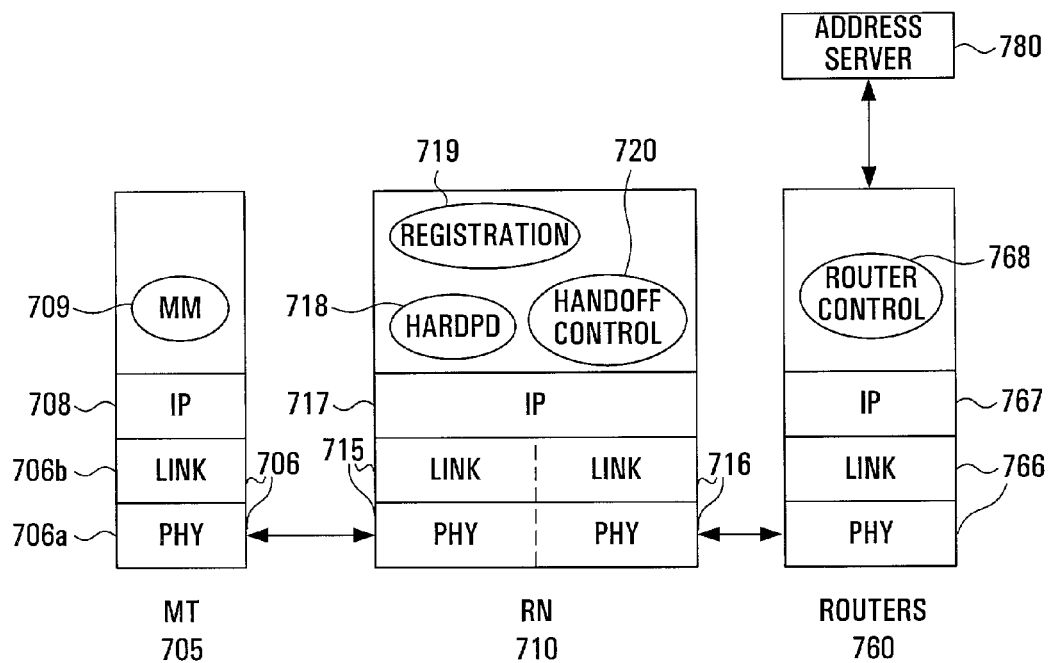
FIG. 7 illustrates the layered protocol software stack for each component in a radio access network (RAN) implementing the WIP protocol suite of the invention.

FIG. 7 is a block diagram highlighting the new functionality introduced into each component of a RAN implementing the WIP protocol suite of the present invention. Conceptually, each component may be represented by a layered protocol software stack in a manner well known to those skilled in the art. In FIG. 7, specifically, a layered protocol software representation is given for a mobile terminal (MT) 705, a radio access node (RN) 710 and a router 760.

Considering the MT 705, the protocol software stack includes a network interface module 706 comprised of a physical hardware layer (PHY) 706a and a data link layer (LINK) 706b, an IP layer 708 and a mobility management (MM) function 709. The mobility management function is responsible for controlling the behavior of physical hardware 706a and data link 706b layers during handoff. It also sends the mobile terminal's IP address to the new radio access node. The mobility management function may be supported by any mobile terminal that uses any mobility protocol e.g. Mobile IP. The details surrounding each of these protocol software layers is well known and no new functionality is, therefore, introduced with respect to the mobile terminal (MT) 705.

As per convention, the radio access node (RN) 710 will consist of two network interface modules 715, 716 in the lowest layers of its protocol stack since it effectively has two network interfaces, one towards the MT 705 and one towards the router 760 to which it attaches. Above these modules resides an IP layer 717. However, above the IP layer 717, new functionality must be introduced in order to facilitate implementation of the WIP protocol suite. Specifically, a HARDP daemon (HARDPD) 718 is responsible for implementing the HARDP protocol, a REGISTRATION component 719 is responsible for implementing the Mobile Registration Protocol and a HANDOFF CONTROL component 720 is responsible for implementing the Mobile Location Update Protocol. Note that the REGISTRATION component 719 and the HANDOFF CONTROL component 720 may be implemented by appropriate software, and/or hardware and/or firmware.

And finally, each router 760 will also consist of the standard lower protocol software layers, namely a network interface module 766 and an IP layer 767. To implement the WIP protocol suite of the invention, each router 760 in the RAN must also contain an additional ROUTER CONTROL software component 768 which may reside above the IP layer 767, as shown in FIG. 7. The ROUTER CONTROL software 768 handles all aspects of managing mobile terminal mobility by updating the routing table of a router upon mobile terminal registration and during a respective handoff. It is apparent that implementation of the WIP protocol suite requires new functionality to be introduced into each radio access node and router within a RAN.

Figure 8:
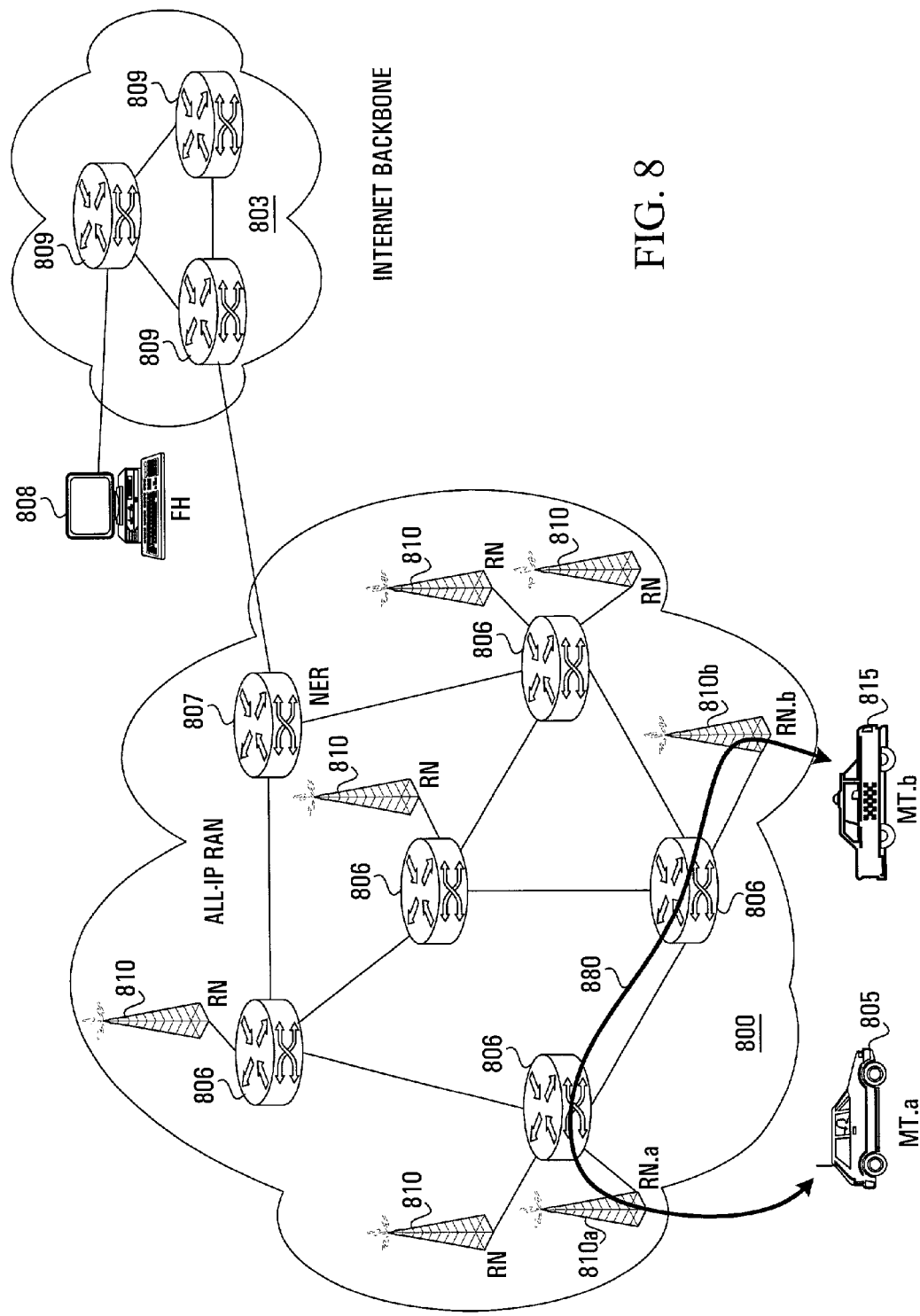
FIG. 8 is an example depicting the establishment of an optimal mobile-to-mobile communications path in an all-IP RAN implementing the WIP protocol suite of the invention.

Advantageously, the WIP protocol suite of the invention provides optimal paths for data packet forwarding in all mobile-to-mobile, mobile-to-fixed and fixed-to-mobile communications. Consider, for example, a system as shown FIG. 8 comprising an all-IP RAN 800 connected to an Internet backbone 803 via a network edge router (NER) 807. The Internet backbone 803 is represented by a set of routers 809. The RAN 800 comprises a plurality of radio access nodes (RNs) 810 (including 810a, 810b) attached to a plurality of cooperative interconnected packet routers 806. A first mobile terminal (MT.a) 805 establishes a wireless communications link with a radio access node (RN.a) 810a in whose coverage area it resides, while a second mobile terminal (MT.b) 815 establishes a similar link with a corresponding radio node (RN.b) 810b. A fixed host (FH) 808 is located outside of the RAN 800 and is connected via an access network (not shown) to the Internet backbone 803.

With respect to fixed-to-mobile communications, consider that the fixed host (FH) 808 sends a data packet to MT.a 805. This packet will reach the NER 807 of the RAN 800 because the IP address of the destination can be used to identify the RAN 800 where MT.a 805 currently resides. The routers that subsequently receive this packet will forward it to the next-hop device which is on the optimal route towards the final destination. Eventually, this packet will arrive at MT.a 805 along the optimal route from ingress NER 807 to MT.a 805.

For mobile-to-fixed communications, suppose that the mobile terminal (MT.a) 805 desires to send a packet to the fixed host (FH) 808 located outside of the RAN 800. Since the destination address is not in the RAN 800, routers in the RAN 800 that receive this packet will use the conventional 'longest match algorithm' in conjunction with their external routing tables to determine the next-hop device and forward this packet accordingly. Eventually, then, the packet will arrive at the fixed host (FH) 808 using traditional IP routing.

And lastly, with respect to mobile-to-mobile communications, suppose MT.a 805 wants to send a data packet to MT.b 815 which is located within the same RAN 800. The routers that receive this packet forward it to the next-hop device which is on an optimal route 880 towards the MT.b 815. The optimal route 880 is captured by the next-hop forwarding entries for MT.b 815 in the internal cache routing table for each router. Accordingly, the inefficiency attributed to the 'triangular routing' of data packets does not exist as it does in the other existing mobility protocols.

In summary, the protocol suite of the present invention introduces several new features over existing mobility protocols. Firstly, all the routers use optimal next-hop forwarding paths for the mobile terminals based on their current points of attachment to the radio access network. Secondly, all valid IP addresses in a radio access network (RAN) are indexed in the routing tables of all routers in the RAN. Thirdly, a new protocol coined HARDP identifies the minimal set of routers that needs to be updated when handoff occurs between two neighboring radio access nodes. This minimal set of routers is termed the HARG and may be organized as a multicast group. When a mobile terminal performs a handoff to a new radio access node, multicasting or reliable multicasting may be used to update all routers in the HARG.

The features of WIP, therefore, make it an efficient and powerful protocol for supporting micro-mobility within a RAN. In the WIP paradigm, the radio access network (RAN) is a fully routed IP network i.e. a tunnel is not required to support mobility. WIP also employs a very efficient data forwarding scheme requiring only one memory-access operation to determine the next-hop. Furthermore, WIP uses a very efficient routing table update scheme consisting of only one memory-copy operation. WIP is compatible with various IP routing protocols (e.g. OSPF, RIP etc.) as well as with the Mobile IP protocol supporting wide-area mobility.

As described earlier, following a handoff, WIP isolates the location updates to only a small group of routers (HARG) close to the involved radio nodes. The implementation described only changes the unicast data packet forwarding mechanism in the routers. The original IP multicast data forwarding and group membership management are not affected. If a mobile terminal is a member of an active multicast session and a handoff is required, it must "re-join" the same group from the new radio access node (RN) and "leave" the same group from the old radio access node (RN). In addition, the mobile terminal must also multicast a registration message to the respective HARG between the old and new radio access nodes to update its location (next-hop forwarding entries) for unicast.

It is important to note that in case all nodes in a RAN have the same network-prefix, it may be possible to implement the entire protocol suite of the invention using only the host (terminal) portion of the network address to determine next hop forwarding path.

In another embodiment, the entire protocol suite can also be used as a mobile routing protocol for updating MT reachability in a set of mobile agents (e.g., hierarchical foreign agents) that are interconnected by IP tunnels. These agents and tunnels form an overlay network on top of an IP network.

While preferred embodiments of the invention have been described and illustrated, it will be apparent to those skilled in the art that numerous modifications, variations and adaptations may be made without departing from the scope of the invention as defined in the claims appended hereto.

The invention claimed is:

1. A system for forwarding data packets to a mobile terminal comprising:
   a radio access network comprising at least one externally connected gateway node, a plurality of packet routers, and a plurality of radio access nodes each having a respective coverage area and each for establishing a wireless communications link with mobile terminals within the respective coverage area, each packet router and each radio access node having a respective network address, each packet router associating a next-hop forwarding entry with each of the radio access nodes;
   a first protocol to provide an assigned network address to a mobile terminal for a communications session initially through a particular radio access node within whose coverage area the mobile terminal is located and to broadcast the assigned network address and the network address of the particular radio access node to the plurality of packet routers so as to cause each packet router to create a new next-hop forwarding entry for the mobile terminal, the new next-hop forwarding entry for the mobile terminal corresponding with the next-hop forwarding entry for the particular radio access node;
   a second protocol to update the next-hop forwarding entries for the mobile terminal for a subset of the packet routers when the mobile terminal moves from the coverage area of the particular radio access node to the coverage area of a subsequent radio access node by causing each packet router in the subset of packet routers to change the next-hop forwarding entry for the mobile terminal to correspond with the next-hop forwarding entry for the subsequent radio access node;
   a third protocol to define said subset of the packet routers for each {particular radio access node, subsequent radio access node} pair such that only the subset of packet routers are required to update their next-hop forwarding entries for a mobile terminal handoff from the particular radio access node to the subsequent radio access node.

2. A system according to claim 1 further comprising an address server located within the radio access network;
   wherein the first protocol is adapted to obtain the assigned network address for the mobile terminal from the address server.

3. A system according to claim 2 wherein the address server is an extended dynamic host configuration protocol (DHCP) server.

4. A system according to claim 2 wherein the first protocol comprises:
   the mobile terminal establishing a wireless communications link with the particular radio access node within whose coverage area the mobile terminal is located;
   the mobile terminal sending a first message to the particular radio access node within whose coverage area the mobile terminal is located, the first message requesting said assigned network address;
   the particular radio access node receiving the first message and sending a second message to the address server requesting said assigned network address;
   the address server responding to the particular radio access node with a third message comprising said assigned network address for the mobile terminal;
   the particular radio access node forwarding the third message to the mobile terminal and then broadcasting a fourth message to the plurality of packet routers in the radio access network, the fourth message comprising the network address for the particular radio access node and the assigned network address for the mobile terminal;
   each of the plurality of packet routers adding a new next-hop forwarding entry for the mobile terminal corresponding to the next-hop forwarding entry for the particular radio access node within whose coverage area the mobile terminal is located.

5. A system according to claim 1 wherein the third protocol is adapted to include in the subset only those packet routers having different next-hop forwarding entries for the particular and subsequent radio access nodes.

6. A system according to claim 5 further comprising an address server located within the radio access network;
   wherein the third protocol adapted to define said subset of the packet routers for each {particular radio access node, subsequent radio access node} pair comprises:
   the particular radio access node broadcasting a first message to the subsequent radio access node;
   the subsequent radio access node in response to the first message sending a second message to the address server identifying the particular radio access node and the subsequent radio access node;
   the address server assigning a single multicast address to represent said subset of packet routers and sending the multicast address in a third message to the subsequent radio access node;
   the subsequent radio access node sending a fourth message to the particular radio access node containing the multicast address assigned to said subset of packet routers;
   the particular radio access node broadcasting a fifth message to each of said plurality of packet routers, the fifth message comprising the network address of the particular radio access node, the network address of the subsequent radio access node and the multicast address assigned to said subset of packet routers;

each of said plurality of packet routers comparing the next-hop forwarding entry for the particular radio access node to the next-hop forwarding entry for the subsequent radio access node and in the event that the next-hop forwarding entries are different, issuing a request message to join the subset of packet routers to which the multicast address is assigned.

7. A system according to claim 5 further comprising an address server located within the radio access network;
wherein the third protocol adapted to define said subset of the packet routers for each particular radio access node, subsequent radio access node pair comprises:
the particular radio access node sending a first message to the subsequent radio access node;
the subsequent radio access node in response to the first message sending a second message to the address server identifying the particular radio access node and the subsequent radio access node;
the address server assigning a single multicast address to represent said subset of packet routers and sending the multicast address in a third message to the subsequent radio access node;
the subsequent radio access node sending a fourth message to the particular radio access node, the fourth message comprising the multicast address assigned to said subset of packet routers and a virtual handoff mobile address;
the particular radio access node broadcasting a fifth message to each of said plurality of packet routers, the fifth message comprising the network address of the particular radio access node and the virtual handoff mobile address;
each of said plurality of packet routers receiving the fifth message and adding a first next-hop forwarding entry for the virtual handoff mobile address, the first next-hop forwarding entry for the virtual handoff mobile address corresponding to the next-hop forwarding entry for the particular radio access node;
the particular radio access node sending a sixth message to the subsequent radio access node, the sixth message triggering the subsequent radio access node to broadcast a seventh message to each of said plurality of packet routers, the seventh message comprising the virtual handoff mobile address, the network address of the subsequent radio access node and the multicast address assigned to said subset of packet routers;
each of said plurality of packet routers computing a second next-hop forwarding entry for the virtual handoff mobile address;
each of said plurality of packet routers comparing the second next-hop forwarding entry for the virtual handoff mobile address to the first next-hop forwarding entry for the virtual handoff mobile address and in the event that the next-hop forwarding entries are different, issuing a request message to join the subset of packet routers to which the multicast address is assigned;
the particular radio access node broadcasting an eighth message the said plurality of packet routers so as to cause each packet router to remove the next-hop forwarding entry for the virtual handoff mobile address.

8. A system according to claim 1 wherein the first protocol pre-allocates a set of addresses to each radio access node and sets up routes for these addresses in the routers before the addresses are actually assigned to mobile terminals.

9. A system according to claim 1 wherein the second protocol comprises:
the particular radio access node sending a first message to the mobile terminal indicating that a wireless communications link to the subsequent radio access node should be established;
the mobile terminal receiving the first message and sending a second message to the subsequent radio access node in order to establish a wireless communications link to the subsequent radio access node, the second message identifying the mobile terminal and the particular radio access node whose coverage area the mobile terminal is leaving;
the subsequent radio access node receiving the second message and sending a third message to said subset of packet routers, the third message comprising the network address of the subsequent radio access node and the network address of the mobile terminal;
each packet router in said subset of packet routers receiving the third message and changing the next-hop forwarding entry for the mobile terminal to correspond to the next-hop forwarding entry for the subsequent radio access node.

10. A system according to claim 1 wherein the network addresses are Internet Protocol (IP) addresses.

11. A system according to claim 1 wherein the data packets are Internet Protocol (IP) packets.

12. A system according to claim 11 adapted for use with IP version 4 or IP version 6.

13. A system according to claim 1 wherein the first, second and third protocols together provide a protocol suite adapted to function as a mobile routing protocol for updating a mobile terminal's reachability in an overlay network that comprises mobility agents connected by IP tunnels over network routers.

14. A system according to claim 13 wherein the protocol suite runs in the mobility agents.

15. A method for forwarding data packets to a mobile terminal within a radio access network comprising a plurality of packet routers and a plurality of radio access nodes each having a respective network address, the method comprising:
providing each packet router with a respective next-hop forwarding table populated with next-hop forwarding entries for each of the plurality of radio access nodes;
providing an assigned network address to a mobile terminal for a communications session initially through a particular radio access node within whose coverage area the mobile terminal is located;
broadcasting the assigned network address and the network address of the particular radio access node to the plurality of packet routers so as to cause each packet router to create a new next-hop forwarding entry for the mobile terminal, the new next-hop forwarding entry for the mobile terminal corresponding with the next-hop forwarding entry for the particular radio access node;
updating the next-hop forwarding tables of a subset of the plurality of packet routers when the mobile terminal moves from the coverage area of the particular radio access node to the coverage area of a subsequent radio access node by causing each packet router in the subset of packet routers to change the next-hop forwarding entry for the mobile terminal to correspond to the next-hop forwarding entry for the subsequent radio access node.

16. A method according to claim 15 further comprising for each {particular radio access node, subsequent radio access node} pair, defining the subset of packet routers whose next-hop forwarding tables need to be updated when the mobile terminal moves from the coverage area of the particular radio access node to the coverage area of the subsequent radio access node such that only the subset of packet routers are required to update their next-hop forwarding tables.

17. A method according to claim 16 further comprising each router updating its membership in the subset for a {particular radio access node, subsequent radio access node} pair when the next-hop forwarding entry for either or both of the particular radio access node and the subsequent radio access node changes.

18. A method according to claim 15 further comprising radio access nodes learning a neighboring relationship with other radio access nodes in terms of common coverage areas.

19. A method according to claim 15 wherein the data packets are Internet Protocol (IP) packets.

20. A method according to claim 15 wherein the network addresses are Internet Protocol (IP) addresses.

21. A packet router comprising:
   a next-hop forwarding table populated with a next-hop forwarding entry for each of a plurality of mobile terminals and a plurality of radio access nodes;
   an input to receive a message identifying a network address for a mobile terminal and a network address for a particular one of said plurality of radio access nodes within whose coverage area the mobile terminal is located;
   a message processor to process said message by:
   in the event no next-hop forwarding entry exists for the mobile terminal, adding a new next-hop forwarding entry to the next-hop forwarding table for the mobile terminal, the new next-hop forwarding entry corresponding to the next-hop forwarding entry already in the table for the particular radio access node;
   and in the event a next-hop forwarding entry exists for the mobile terminal, changing the next-hop forwarding entry for the mobile terminal to correspond to the next-hop forwarding entry already in the table for the particular radio access node;
   wherein a data packet to be routed contains a destination network address of a mobile terminal to which the packet is to be routed, and the packet router forwards the packet according to the next-hop forwarding entry for the destination network address contained in the packet.

22. A packet router according to claim 21 wherein the next-hop forwarding table is organized as an array indexed with network addresses for each of the plurality of mobile terminals and radio access nodes.

23. A packet router according to claim 21 wherein the next-hop forwarding table is organized as an array and associates a network address for each of the plurality of mobile terminals and radio access nodes with a network address for a next-hop forwarding device.

24. A packet router according to claim 21 further comprising host route summarization and de-summarization algorithms adapted to compress the routing table.

25. A packet router according to claim 24 wherein host route summarization algorithm summarizes common forwarding paths into a single path identified by a common address prefix of destination network addresses.

26. A packet router according to claim 24 wherein the de-summarization algorithm de-summarizes a common forwarding path identified by a common address prefix into separate paths due to a mobile terminals forwarding path departing from the common path.

27. A packet router according to claim 21 adapted to route Internet Protocol (IP) packets.

28. A packet router according to claim 27 wherein the network addresses are Internet Protocol (IP) addresses.

29. A mobility agent connected with other mobility agents using IP tunnels, the mobility agent to provide a protocol suite comprising:
   a first protocol to provide an assigned network address to a mobile terminal for a communications session initially through a particular radio access node within whose coverage area the mobile terminal is located and to broadcast the assigned network address and the network address of the particular radio access node to a plurality of packet routers so as to cause each packet router to create a new next-hop forwarding entry for the mobile terminal, the new next-hop forwarding entry for the mobile terminal corresponding with the next-hop forwarding entry for the particular radio access node;
   a second protocol to update the next-hop forwarding entries for the mobile terminal for a subset of the packet routers when the mobile terminal moves from the coverage area of the particular radio access node to the coverage area of a subsequent radio access node by causing each packet router in the subset of packet routers to change the next-hop forwarding entry for the mobile terminal to correspond with the next-hop forwarding entry for the subsequent radio access node;
   a third protocol to define said subset of the packet routers for each {particular radio access node, subsequent radio access node} pair such that only the subset of packet routers are required to update their next-hop forwarding entries for a mobile terminal handoff from the particular radio access node to the subsequent radio access node.

* * * * *